US010920816B2

(12) United States Patent
Ellis

(10) Patent No.: US 10,920,816 B2
(45) Date of Patent: Feb. 16, 2021

(54) FURNITURE SNAP CONNECTOR

(71) Applicant: Jeff Ellis, Anderson, SC (US)

(72) Inventor: Jeff Ellis, Anderson, SC (US)

( * ) Notice: Subject to any disclaimer, the term of this patent is extended or adjusted under 35 U.S.C. 154(b) by 131 days.

(21) Appl. No.: 16/210,795

(22) Filed: Dec. 5, 2018

(65) Prior Publication Data

US 2020/0182278 A1 Jun. 11, 2020

(51) Int. Cl.
*F16B 21/09* (2006.01)
*F16B 21/07* (2006.01)
*A47B 95/00* (2006.01)

(52) U.S. Cl.
CPC ............ *F16B 21/073* (2013.01); *A47B 95/00* (2013.01); *F16B 21/09* (2013.01); *A47B 2230/0074* (2013.01); *A47B 2230/07* (2013.01); *F16B 2200/10* (2018.08)

(58) Field of Classification Search
CPC combination set(s) only.
See application file for complete search history.

(56) References Cited

U.S. PATENT DOCUMENTS

| 3,580,535 | A | * | 5/1971 | Naske | F16B 12/2009 248/239 |
| 4,127,353 | A | * | 11/1978 | Busse | F16B 12/2054 403/245 |
| 4,353,663 | A | * | 10/1982 | Glickman | F16B 12/20 403/230 |
| 5,468,109 | A | * | 11/1995 | Ferrari | F16B 12/24 411/553 |
| 5,754,412 | A | * | 5/1998 | Clavin | H05K 7/142 174/138 D |
| 2004/0195122 | A1 | * | 10/2004 | Awaji | A47B 13/021 206/278 |
| 2006/0093429 | A1 | * | 5/2006 | Trotter | F16B 12/26 403/165 |

* cited by examiner

*Primary Examiner* — Daniel J Wiley
(74) *Attorney, Agent, or Firm* — Perkins Law Firm; John R. Perkins, Jr.

(57) ABSTRACT

The present invention generally relates to an improved furniture connector designed to firmly attach two portions of furniture without the need for tools. The connector is designed to fit into a void within a first surface in much the same manner as a prior art cam connector. When a connector stud in a second surface is inserted into the improved furniture connector, a flexible tab accepts the stud and holds it firmly along a chamfered edge within the connector. Disassembly is then possible as the flexible tab can be released to remove the connector stud.

12 Claims, 8 Drawing Sheets

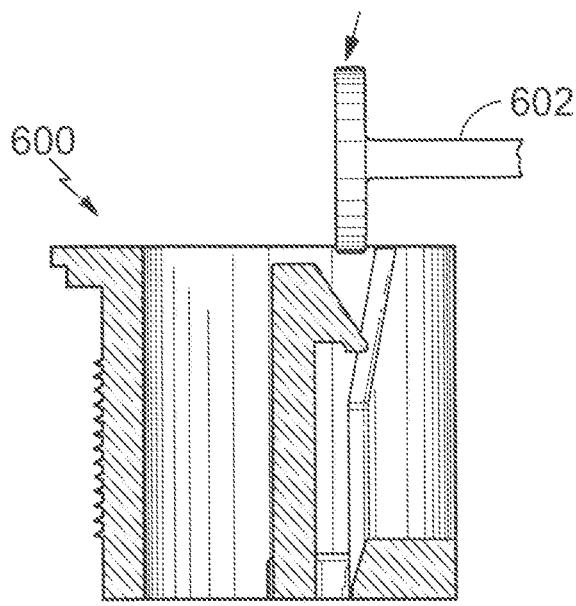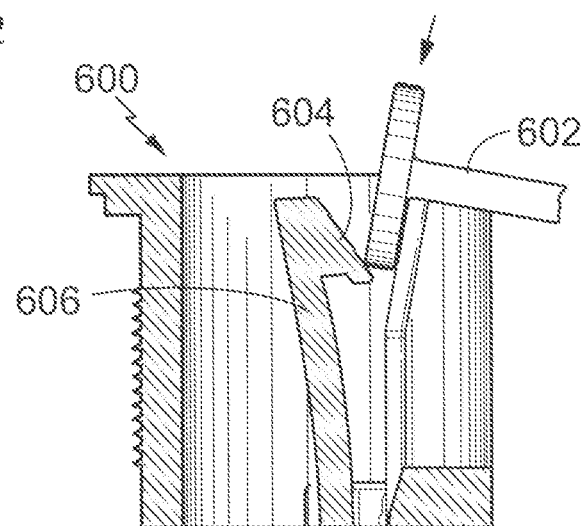
Fig. 6A            Fig. 6B
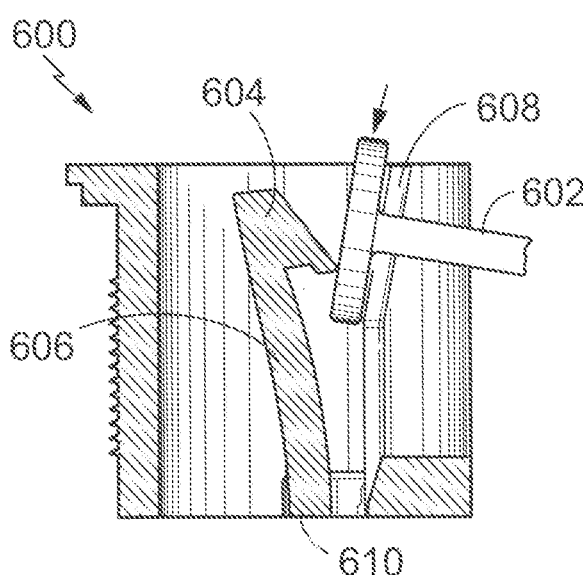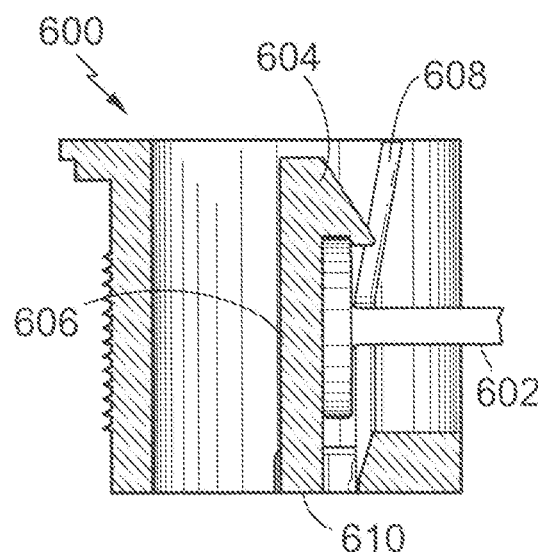
Fig. 6C            Fig. 6D

FURNITURE SNAP CONNECTOR

FIELD OF THE INVENTION

The present invention generally relates to a furniture connector and, more particularly, to a connector that allows a user to connect and disconnect flat surfaces, such as portions of furniture, without the need for tools.

BACKGROUND OF THE INVENTION

Furniture connectors have been used many hundreds of years to connect the various portions of furniture together into a whole. Biscuit joints and rabbit joints, for example, are frequently used in conjunction with an adhesive to permanently join two pieces of solid wood furniture. When the furniture is made of particleboard or other less-expensive woods, however, these types of joints are not as effective. In such cases, a quick connector is generally used. These quick connectors generally use a larger cross section of the wood to avoid separation that would otherwise occur in softer woods or particleboard. While these connectors are very useful in allowing the relatively fast assembly of such furniture, they generally require the use of hand tools. When connections are located in inaccessible or less-accessible locations, hand tools can make the process of assembly virtually impossible.

For these reasons, recent furniture designs, often with furniture made of particleboard, has prompted the advent of new connectors for quick assembly. The most common type of connector is a cam connector that uses a round connector designed for insertion into a pre-drilled hole in a first portion of furniture, which then allows for insertion of a stud from a second portion of the same furniture. Once the stud affixed to the first portion is inserted into the round cam connector located in the second portion, assembly is completed when the cam is rotated by a screwdriver to tighten the cam against the stud, thereby pulling the two portions together to form a tight connection point. As discussed above, however, the standard cam connector can be impractical when the connection points are located in inaccessible areas. When that is the case, assembly and disassembly become nearly impossible.

What is needed is a new type of connector capable of making strong connections between two surfaces. This connector should provide a mechanism to join two portions without the need for hand tools, which can be hard to fit into inaccessible locations. The connector should also allow for disassembly in the same manner, i.e., without the need for tools.

SUMMARY OF THE INVENTION

The present invention accomplishes the foregoing objects by providing a tool-less furniture connector that can be used in place of the standard cam connector. The present invention also accomplishes the foregoing objects by providing a strong connection between two portions of furniture, which connection can be made and later unmade without the need for tools.

More specifically, the present invention provides a connector for securely fastening two solid surfaces together comprising: a barrel for insertion into a void disposed within a solid surface, said barrel comprising a substantially hollow interior; a flexible tab disposed within said barrel affixed to the bottom of said barrel and projecting upwards to the top of said barrel; a u-shaped opening disposed along a vertical side of said barrel extending from a location proximate to the bottom of said barrel and projecting upwards to the top of said barrel to form an opening along the upper lip of said barrel; a chamfered edge disposed within said barrel along both interior vertical edges of said u-shaped opening, wherein the thickness of said chamfered edge increases from the top of said u-shaped opening to the bottom of said u-shaped opening; and a projecting edge disposed along the outer portion of said flexible tab proximate to the top of said flexible tab, wherein said projecting edge is capable of sufficient inward movement to receive a connector stud and further capable of snapping back into place to hold said connector stud securely in place along said chamfered edge.

In other embodiments, the projecting edge is capable of retraction to allow removal of said connector stud. It is also possible that a second projecting edge is disposed along the inner portion of said flexible tab proximate to the top of said flexible tab, wherein downward pressure upon said second projecting edge creates sufficient inward movement to retract said projecting edge.

It is further possible that the barrel comprises one or more edges disposed circumferentially around said barrel for holding said barrel more securely within said void disposed within portion of a solid surface. In another embodiment, the barrel may also contain an outwardly projecting lip disposed circumferentially around the upper edge of said barrel.

While the single barrel is likely to be the most commonly used embodiment of the invention, the connector may also comprise a second barrel combined with said barrel to provide a larger substantially hollow interior. In this manner, a larger second projecting edge may form a thumb tab designed to be pressed to retract and release the projecting edge to facilitate disassembly of the two solid surfaces.

The invention further provides a method of connecting two solid surfaces, comprising: providing a first solid surface, wherein a connector stud is attached thereto; inserting a connector into a void within a second solid surface, said connector comprising: a barrel comprising a substantially hollow interior; a flexible tab disposed within said barrel affixed to the bottom of said barrel and projecting upwards to the top of said barrel; a u-shaped opening disposed along a vertical side of said barrel extending from a location proximate to the bottom of said barrel and projecting upwards to the top of said barrel to form an opening along the upper lip of said barrel; a chamfered edge disposed within said barrel along both vertical edges of said u-shaped opening, wherein the thickness of said chamfered edge increases from the top of said u-shaped opening to the bottom of said u-shaped opening; and a projecting edge disposed along the outer portion of said flexible tab proximate to the top of said flexible connector tab, wherein said projecting edge is capable of sufficient inward movement to receive a connector stud and further capable of snapping back into place to hold said connector stud securely in place along said chamfered edge; and connecting said first solid surface to said second solid surface by inserting said connector stud into said u-shaped opening and moving said connector stud downward along said chamfered edge until said projecting edge moves inward and then snaps back into place to hold said connector stud securely in place.

The method may vary in similar respects to the apparatus embodiments. To wit, the projecting edge may be capable of retraction to allow removal of said connector stud. The connector may also comprise a second projecting edge disposed along the inner portion of said flexible tab proximate to the top of said flexible tab, wherein downward pressure upon said second projecting edge creates sufficient inward movement to retract said projecting edge. Or the connector may comprise one or more edges disposed circumferentially around said barrel for holding said barrel more securely within said void disposed within portion of a solid surface.

It is also possible that the connector further comprises an outwardly projecting lip disposed circumferentially around the upper edge of said barrel. It is even possible that the connector further comprises a second barrel combined with said barrel to provide a larger substantially hollow interior.

DESCRIPTION OF THE DRAWINGS

The invention will be more readily understood with reference to the following specification in conjunction with the drawings herein:

FIG. 6a is a perspective view of an improved furniture snap connector according to a preferred embodiment of the invention, showing the insertion process of a connector stud.

FIG. 6b is a perspective view of an improved furniture snap connector according to a preferred embodiment of the invention, showing the insertion process of a connector stud.

FIG. 6c is a perspective view of an improved furniture snap connector according to a preferred embodiment of the invention, showing the insertion process of a connector stud.

FIG. 6d is a perspective view of an improved furniture snap connector according to a preferred embodiment of the invention, showing the insertion process of a connector stud.

DESCRIPTION OF THE PREFERRED EMBODIMENTS

Figure 1:
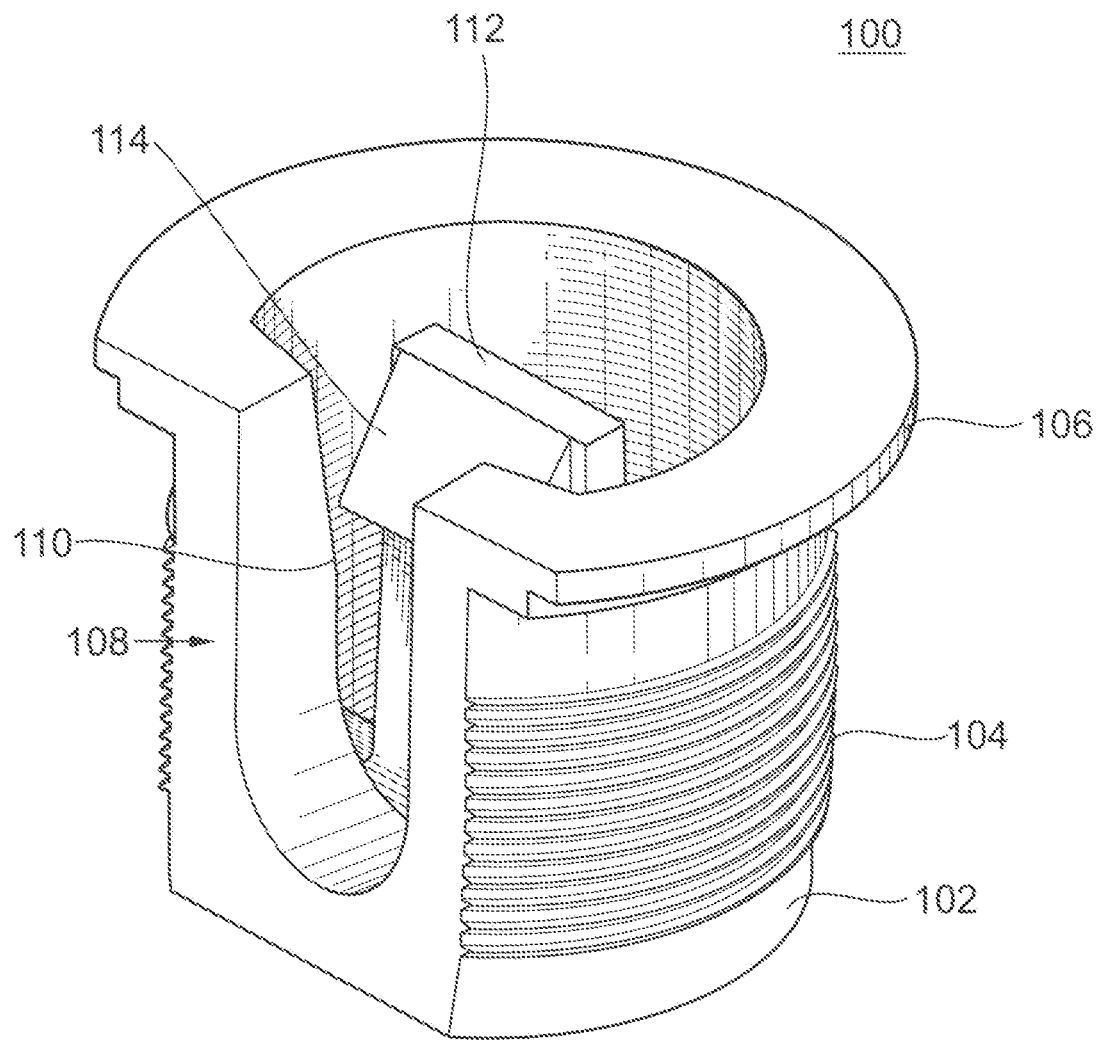
FIG. 1 is a perspective view of an improved furniture snap connector according to a preferred embodiment of the invention.
Figure 2A:
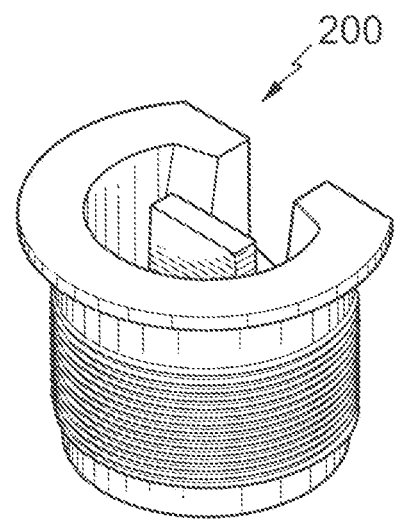
FIG. 2 is a perspective view of an improved furniture snap connector according to a preferred embodiment of the invention, shown from four different perspectives.
Figure 2B:
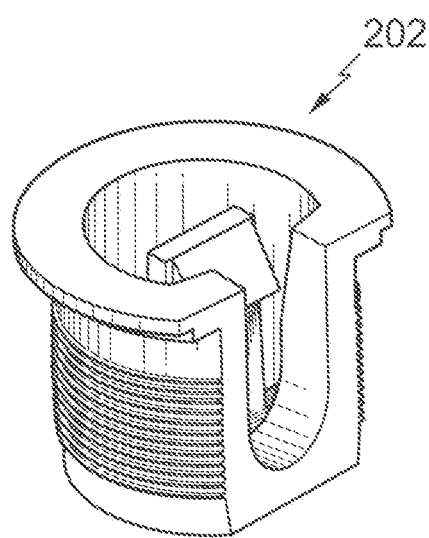
Figure 2C:
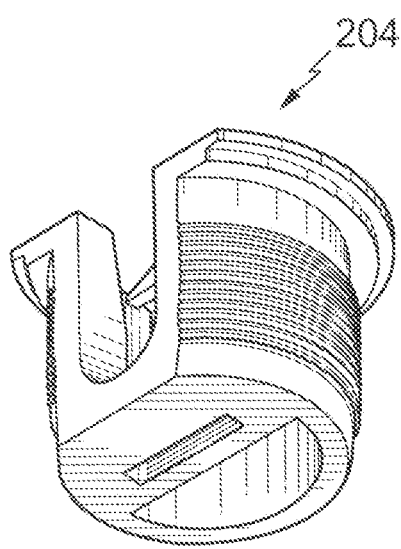
Figure 2D:
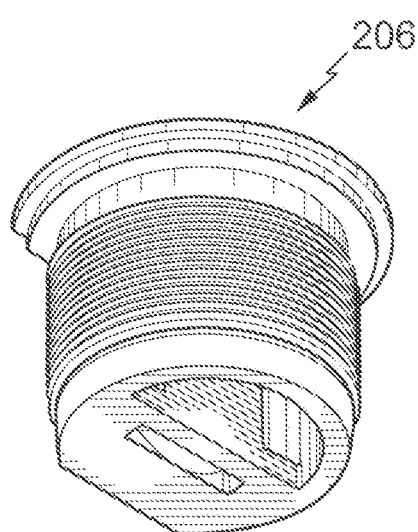

Referring now to FIG. 1, a perspective view of an improved furniture snap connector 100 is illustrated according to a preferred embodiment of the invention. The connector 100 is comprised of a barrel 102 designed for insertion into a void within a solid surface. Barrel 102 comprises one or more edges 104 disposed circumferentially around the barrel for holding the barrel more securely within a void in a solid surface. The upper edge of barrel 102 comprises lip 106.

One side of barrel 102 contains a u-shaped opening 108 that extends substantially the entire vertical length of barrel 102. U-shaped opening 108 opens at the top of the barrel. The interior edges of u-shaped opening 108 contain chamfered edges 110 that increase in angle from the top of barrel 102 towards the bottom of u-shaped opening 108.

The interior of barrel 102 contains a flexible tab 112 that extends vertically from the bottom of the interior of barrel 102 towards the top of barrel 102. Flexible tab 112 is preferably made of a durable but flexible material, such as a hard plastic or rubber, that is securely affixed to the bottom interior of barrel 102 so as to provide a flexible pivot point for flexible tab 112. It is possible to use other materials such as metals for flexible tab 112 and indeed the entirely of connector 100. The top of flexible tab 112 contains a projecting edge 114 disposed along the outer portion of flexible tab 112 proximate to the top of flexible tab 112. Projecting edge 114 provides a catch to hold a connector stud (not pictured) in place within connector 100.

Referring now to FIG. 2, the improved furniture snap connector is illustrated from four perspectives according to a preferred embodiment of the invention. Connector 200 illustrates a top rear perspective. Connector 202 illustrates a top front perspective. Connector 204 illustrates a bottom front perspective. Connector 206 illustrates a bottom rear perspective.

Figure 3:
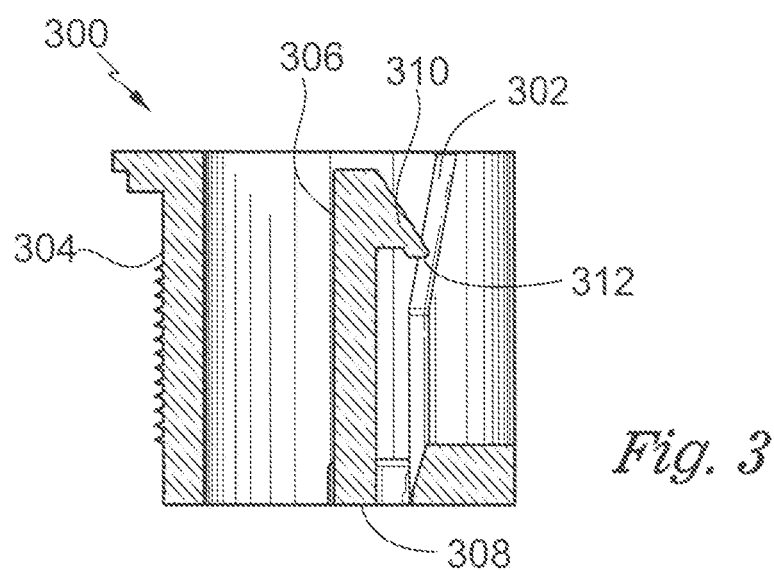
FIG. 3 is a side view of an improved furniture snap connector according to a preferred embodiment of the invention, showing the interior components of the invention.

FIG. 3 illustrates a side view of the improved furniture snap connector 300, showing the interior components of an embodiment of the invention in cross section. Chamfered edge 302 is shown to illustrate the increasing angle as the edge proceeds downward toward the bottom of barrel 304. Flexible tab 306 is shown extending from the bottom of barrel 304 towards the top of barrel 304. The bottom 308 of flexible tab 306 is affixed to the bottom of barrel 304. Bottom 308 provides a pivot point for flexible tab 306 to flex inward and outward while in operation. Projecting edge 310 is designed with an angle as shown. The angle allows for insertion of a connector stud (not shown) downward to push along the edge of projecting edge 310 to force it inwards with a wedge action. The bottom edge 312 of projecting edge 310 is designed to hold the top of a connector stud in place once inserted into connector 300.

Figure 4:
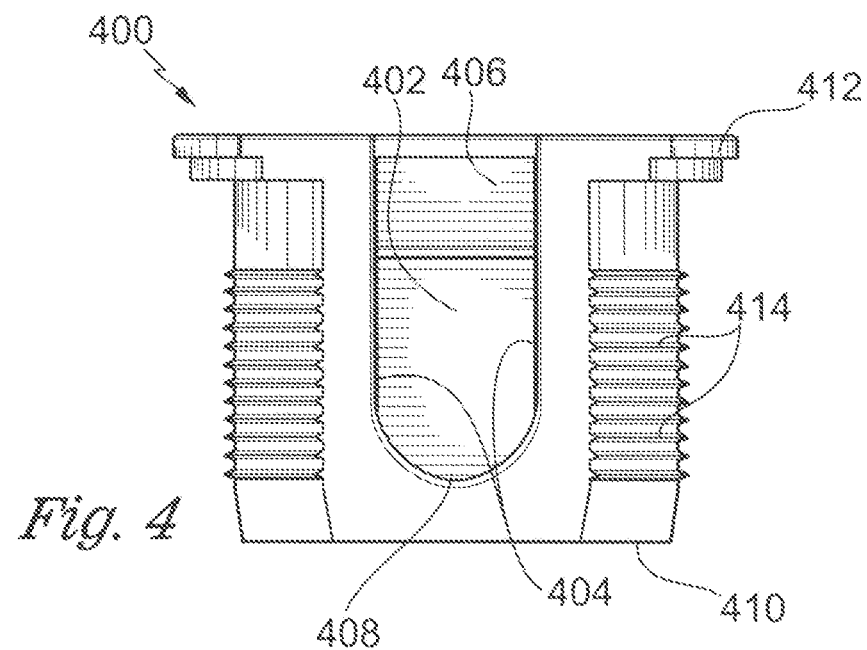
FIG. 4 is a front view of an improved furniture snap connector according to a preferred embodiment of the invention, showing the interior components of the invention.

FIG. 4 provides a front view of an improved furniture snap connector 400 according to a preferred embodiment of the invention, showing the interior components of the invention. FIG. 4 shows the flexible tab 402 as viewed from the outside of connector 400 through the u-shaped opening 404. Here, projecting edge 406 is visible all the way to the bottom 408 of u-shaped opening 404. From this angle, it is clear that the u-shaped opening 404 in this embodiment does not extend to the bottom of barrel 410. Also from this angle, it is clear that flexible tab 402 extends towards the top of barrel 410, substantially to the height of lip 412 included in this embodiment but may not in fact reach lip 412 or the top of barrel 410. Also visible are edges 414 disposed circumferentially around barrel 410 for holding the barrel more securely within a void in a solid surface.

Figure 5A:
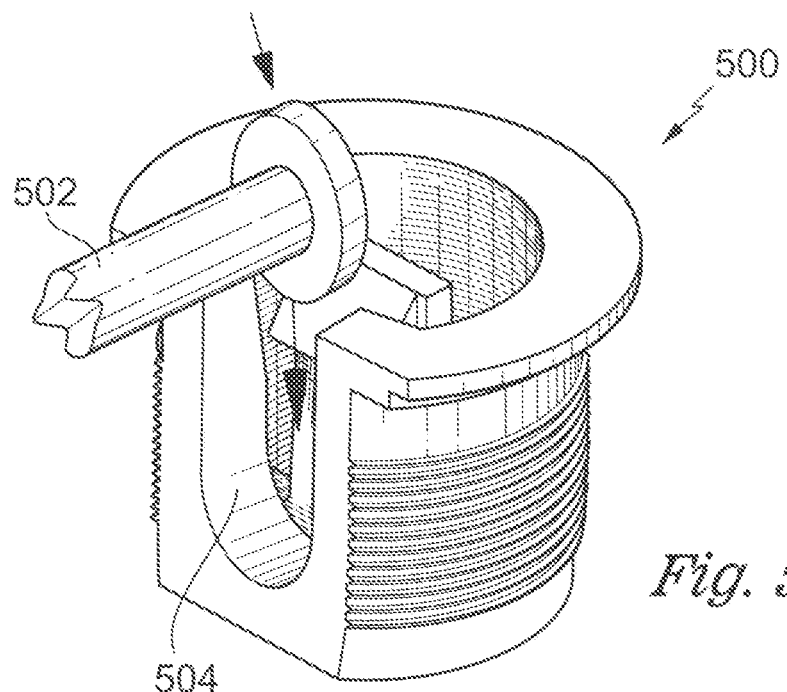
FIG. 5a is a perspective view of an improved furniture snap connector according to a preferred embodiment of the invention, showing the insertion process of a connector stud.
Figure 5B:
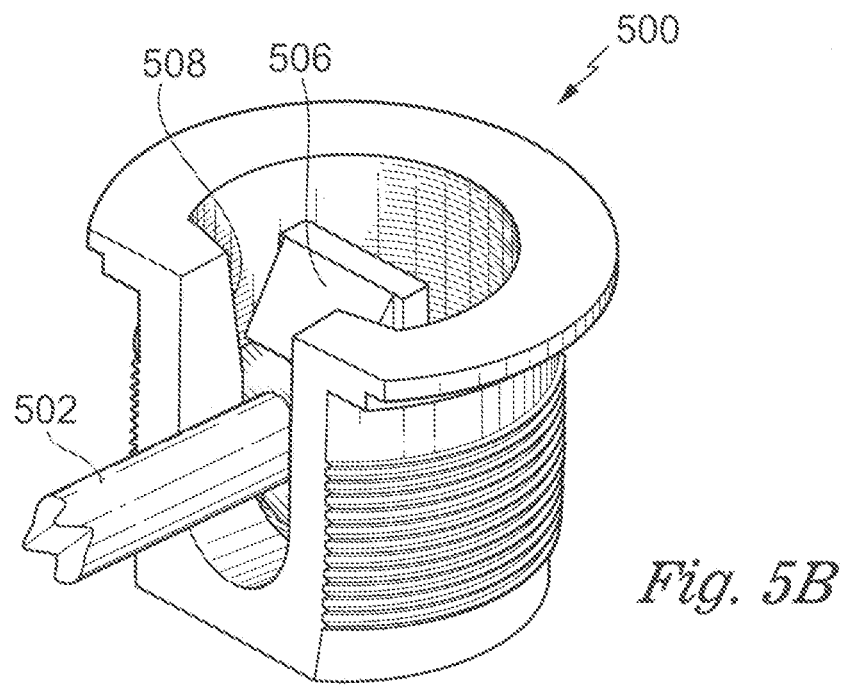
FIG. 5b is a perspective view of an improved furniture snap connector according to a preferred embodiment of the invention, showing the insertion process of a connector stud.

FIGS. 5a and 5b illustrate the insertion process for a connector stud into an embodiment of improved furniture snap connector 500. FIG. 5a shows connector stud 502 moving downward into u-shaped opening 504. As connector stud 502 moves into place, as shown in FIG. 5*b*, it snaps into place under projecting edge 506, which holds it firm against the opposing side of chamfered edges 508.

The same process is illustrated again in FIGS. 6*a* through 6*d*. Here in FIG. 6*a* connector stud 602 moves downward into an embodiment of improved furniture snap connector 600. As connector stud 602 moves further downward into connector 600, it first contacts the upper portion of the projecting edge 604 disposed at the top of flexible tab 606, as shown in FIG. 6*b*. As connector stud 602 moves downward through the u-shaped opening (not visible from this angle), the head of connector stud 602 presses between chamfered edge 608 and projecting edge 604, with a wedge action forcing flexible tab 606 to pivot inwards along its base 610. Once connector 602 has moved far enough downward along this path, the top of connector stud 602 descends past the bottom of projecting edge 604, which allows flexible tab 606 to snap back into place by pivoting the opposite direction along its base 610. At this point, connector stud 602 is held firmly in place, squeezed between flexible tab 606 and chamfered edge 608, while prevented from moving upwards by projecting edge 604.

Figure 7:
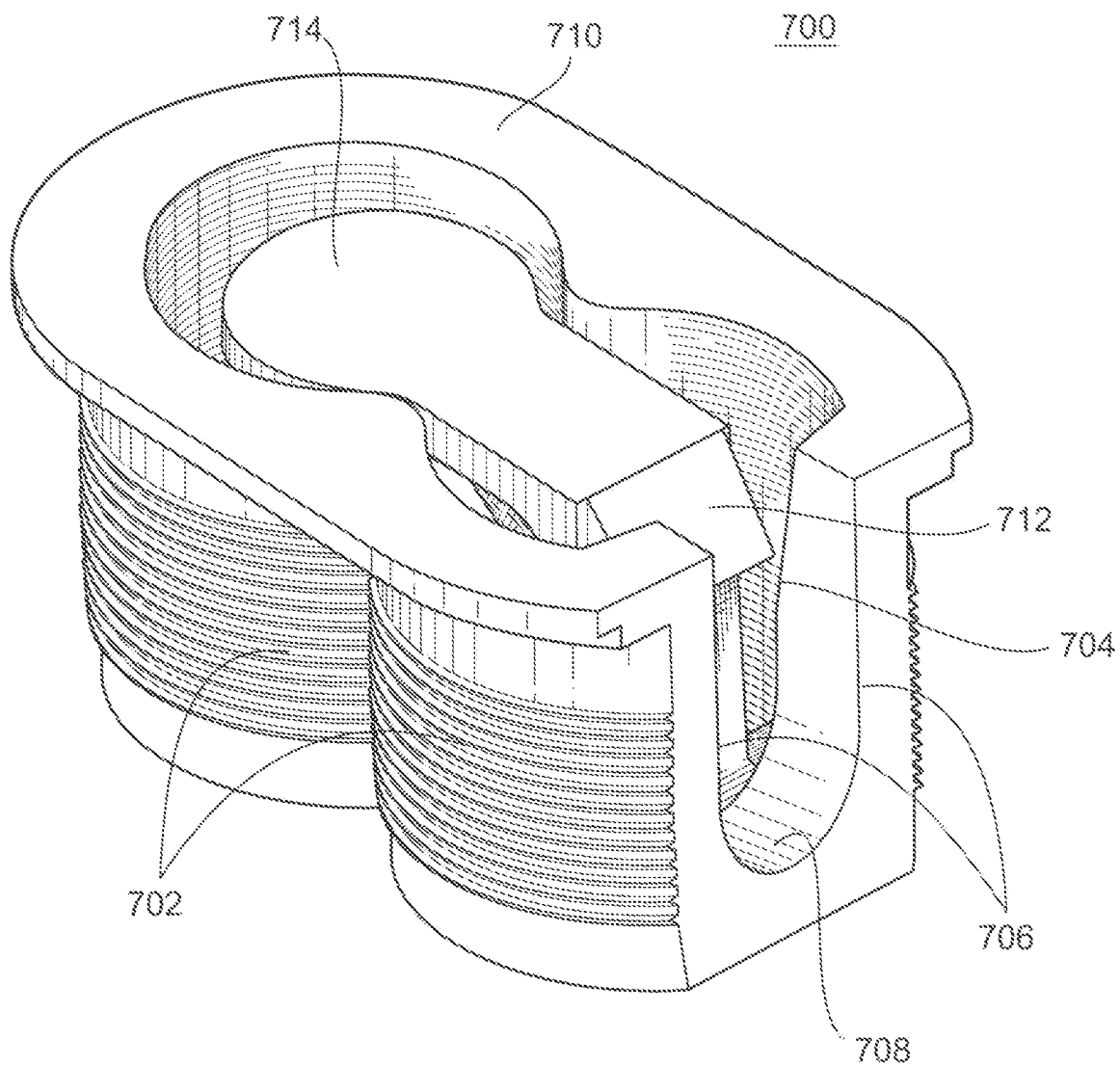
FIG. 7 is a perspective view of an improved furniture snap connector according to a preferred embodiment of the invention, showing a double barrel configuration.
Figure 8A:
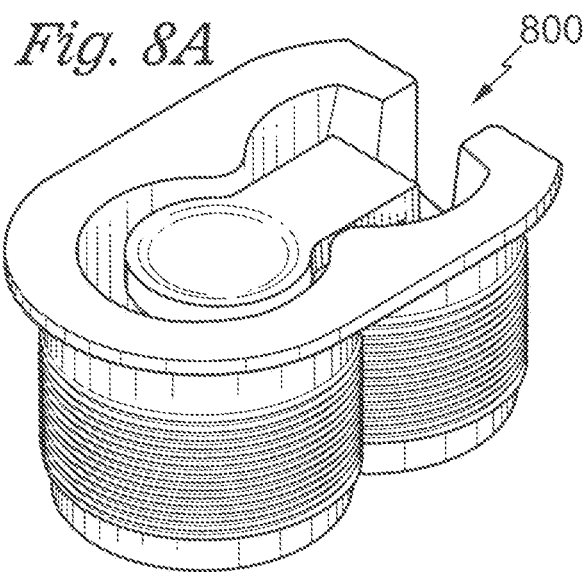
FIG. 8 is a perspective view of an improved furniture snap connector according to a preferred embodiment of the invention, showing a double barrel configuration from four different perspectives.
Figure 8B:
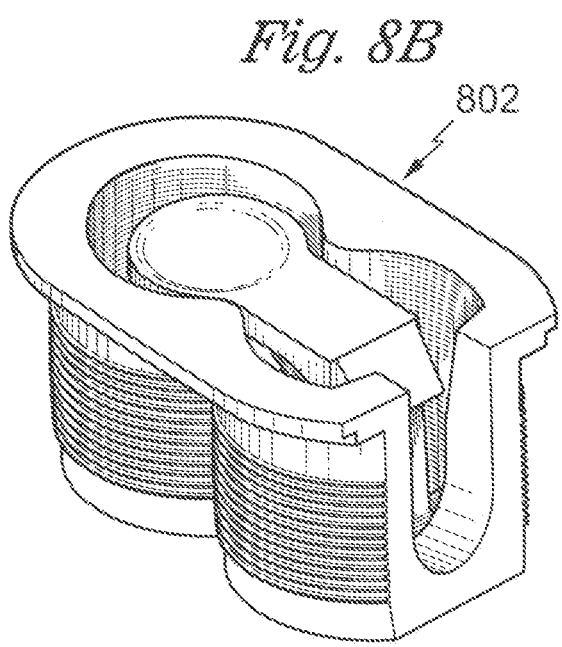
Figure 8C:
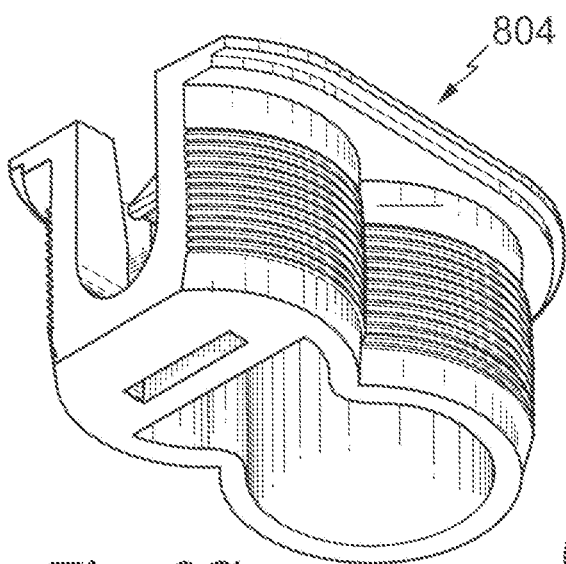
Figure 8D:
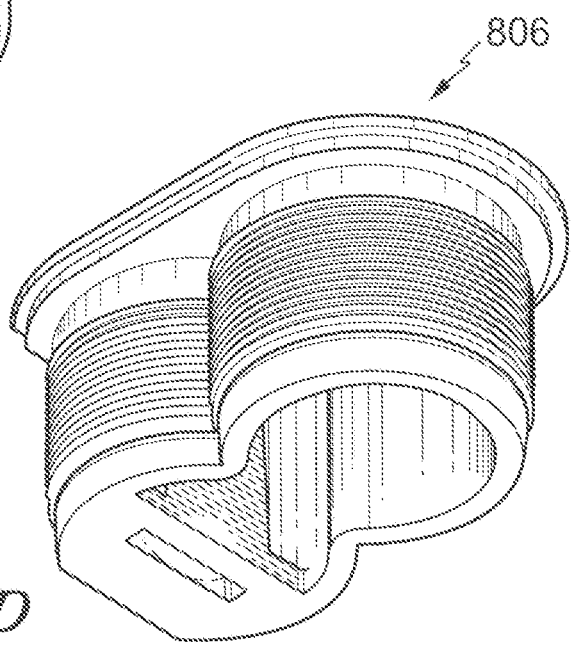

An alternative embodiment of the invention is illustrated with improved furniture snap connector 700 in FIG. 7. Here, the invention is illustrated with two barrels 702. In this embodiment, all of the remaining components operate in the same manner, with a few exceptions. Chamfered edges 704 are the same. U-shaped opening 706 is the same. The bottom 708 of u-shaped opening 706 is the same. Lip 710 is the same. The primary difference is that the flexible tab now contains a finger release 714 on the opposite side of the flexible tab from the projecting edge 712. The finger release 714 is designed to make it easier to pivot projecting edge 712 when inserting and removing a connector stud. An operator just presses downward on finger release 714 to move projecting edge 712 inward and away from chamfered edge 704, thereby releasing the pressure on a connector stud.

Referring now to FIG. 8, the double-barreled connector is illustrated from four perspectives according to a preferred embodiment of the invention. Connector 800 illustrates a top rear perspective. Connector 802 illustrates a top front perspective. Connector 804 illustrates a bottom front perspective. Connector 806 illustrates a bottom rear perspective.

Figure 9:
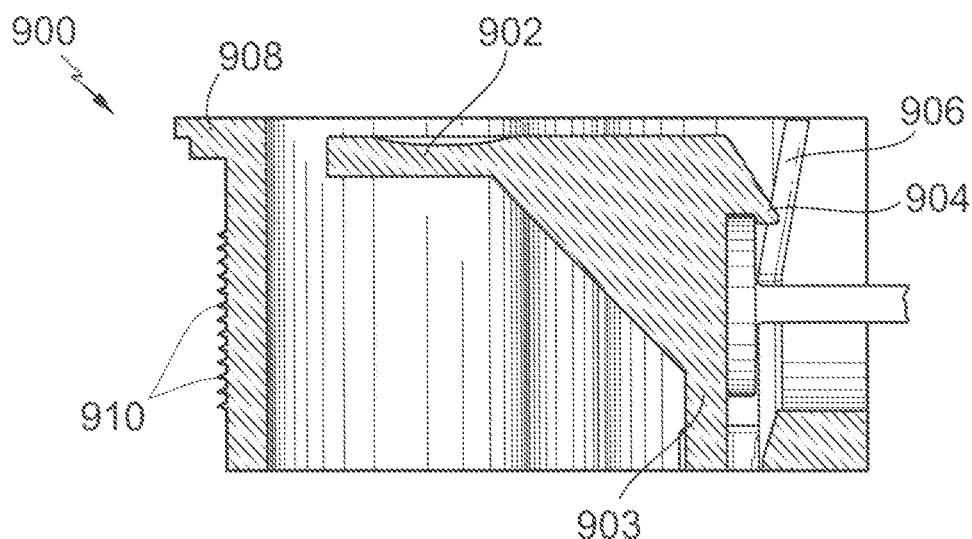
FIG. 9 is a perspective view of an improved furniture snap connector according to a preferred embodiment of the invention, showing the interior components of a double barrel configuration.

The interior of the double-barreled embodiment is further illustrated in FIG. 9. Connector 900 is illustrated in a side-view perspective, showing the interior components of this embodiment. Finger release 902 is shown on the opposing side of flexible tab 903 from projecting edge 904. Chamfered edge 906 is visible. And lip 908 is also visible. The one or more edges 910 are preferable included on the outside of connector 900 to more firmly hold connector 900 in place within a void of a solid surface.

Figure 10:
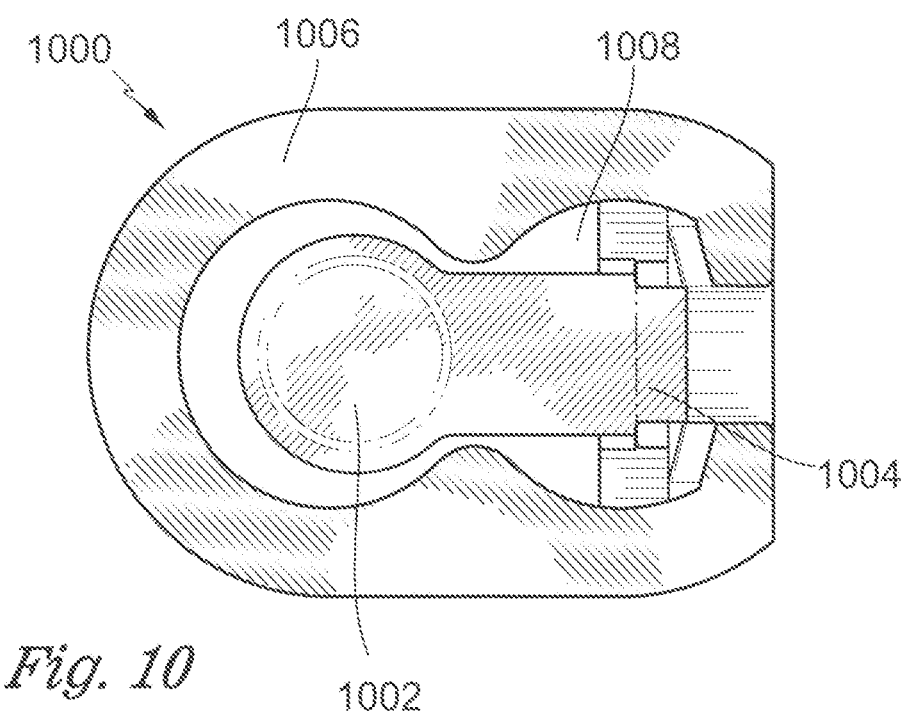
FIG. 10 is a top view of an improved furniture snap connector according to a preferred embodiment of the invention, showing a double barrel configuration.

FIG. 10 illustrates the double-barreled embodiment of connector 1000 from a top side perspective. Here finger release 1002 is shown as resting above the substantially empty second barrel 1006. It is connected to the opposite side of the flexible tab from projecting edge 1004, which rests within the first barrel 1008.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A connector for securely fastening two solid surfaces together comprising:
   a barrel for insertion into a void disposed within a solid surface, said barrel comprising a substantially hollow interior;
   a flexible tab disposed within said barrel affixed to a bottom of said barrel and projecting upwards to a top of said barrel;
   a u-shaped opening disposed along a vertical side of said barrel extending from a location proximate to the bottom of said barrel and projecting upwards to the top of said barrel to form an opening along an upper lip of said barrel;
   a chamfered edge disposed within said barrel along corresponding interior vertical edges of said u-shaped opening, wherein a thickness of said chamfered edge increases from the top of said u-shaped opening to the bottom of said u-shaped opening; and
   a projecting edge disposed along an outer portion of said flexible tab proximate to the top of said flexible tab, wherein said projecting edge is capable of sufficient inward movement to receive a connector stud and further capable of snapping back into place to hold said connector stud securely in place along said chamfered edge.

2. The connector of claim 1 wherein said projecting edge is capable of retraction to allow removal of said connector stud.

3. The connector of claim 1 further comprising a second projecting edge disposed along an inner portion of said flexible tab proximate to a top of said flexible tab, wherein downward pressure upon said second projecting edge creates sufficient inward movement to retract said projecting edge.

4. The connector of claim 1 further comprising one or more edges disposed circumferentially around said barrel for holding said barrel more securely within said void.

5. The connector of claim 1 further comprising an outwardly projecting lip disposed circumferentially around an upper edge of said barrel.

6. The connector of claim 1 further comprising a second barrel combined with said barrel to provide a larger substantially hollow interior.

7. A method of connecting two solid surfaces, the method comprising:
   providing a first solid surface, wherein a connector stud is attached thereto;
   inserting a connector according to claim 1 into a void within a second solid surface; and
   connecting said first solid surface to said second solid surface by inserting said connector stud into said u-shaped opening and moving said connector stud downward along said chamfered edge until said projecting edge moves inward and then snaps back into place to hold said connector stud securely in place.

8. The method of claim 7 wherein said projecting edge is capable of retraction to allow removal of said connector stud.

9. The method of claim 7 wherein said connector further comprises a second projecting edge disposed along an inner portion of said flexible tab proximate to a top of said flexible tab, wherein downward pressure upon said second projecting edge creates sufficient inward movement to retract said projecting edge.

10. The method of claim 7 wherein the connector further comprises one or more edges disposed circumferentially around said barrel for holding said barrel more securely within said void.

11. The method of claim 7 wherein the connector further comprises an outwardly projecting lip disposed circumferentially around an upper edge of said barrel.

12. The method of claim 7 wherein the connector further comprises a second barrel combined with said barrel to provide a larger substantially hollow interior.

\* \* \* \* \*